United States Patent
Stead et al.

(10) Patent No.: US 9,347,592 B2
(45) Date of Patent: May 24, 2016

(54) INTERLOCK COUPLING WITH COMPONENTS WHICH PREVENT INTERCHANGEABILITY

(71) Applicants: Kelly Maxwell Stead, Maple Ridge (CA); Edwin John William Zonneveld, Fort Langley (CA)

(72) Inventors: Kelly Maxwell Stead, Maple Ridge (CA); Edwin John William Zonneveld, Fort Langley (CA)

(*) Notice: Subject to any disclaimer, the term of this patent is extended or adjusted under 35 U.S.C. 154(b) by 345 days.

(21) Appl. No.: 13/731,892

(22) Filed: Dec. 31, 2012

(65) Prior Publication Data

US 2014/0183860 A1 Jul. 3, 2014

(51) Int. Cl.
*F16L 25/08* (2006.01)
*F16L 37/16* (2006.01)

(52) U.S. Cl.
CPC *F16L 25/08* (2013.01); *F16L 37/16* (2013.01)

(58) Field of Classification Search
CPC .................................. F16L 37/16; F16L 25/08
USPC ......... 285/312, 320, 403, 404, 278, 276, 330, 285/328, 334.1, 12, 88, 87
See application file for complete search history.

(56) References Cited

U.S. PATENT DOCUMENTS

| | | | | | |
|---|---|---|---|---|---|
| 25,283 | A | * | 8/1859 | Smith | 285/360 |
| 175,902 | A | * | 4/1876 | Baker | 285/404 |
| 1,261,687 | A | * | 4/1918 | Brandon | 285/312 |
| 2,518,026 | A | * | 8/1950 | Krapp | 285/312 |
| 4,361,353 | A | * | 11/1982 | Vinson | 294/86.1 |
| 2010/0308578 | A1 | * | 12/2010 | Skellern et al. | 285/379 |

* cited by examiner

*Primary Examiner* — David E Bochna
*Assistant Examiner* — James Linford

(57) ABSTRACT

A quick-disconnect coupling such as a camlock includes a hollow male plug with an external peripheral groove and a hollow female socket defining a duct for communication of a fluid with a locking arrangement for locking the male plug in the female socket. Protrusions are provided on either an inside surface of the female socket or on an outside surface of the male plug and corresponding recesses are provided on the other with the recesses and protrusions being cooperatively shaped and arranged to allow insertion of the male plug member into the female socket member to the locking position only when at least one recess and at least one protrusion match.

5 Claims, 8 Drawing Sheets

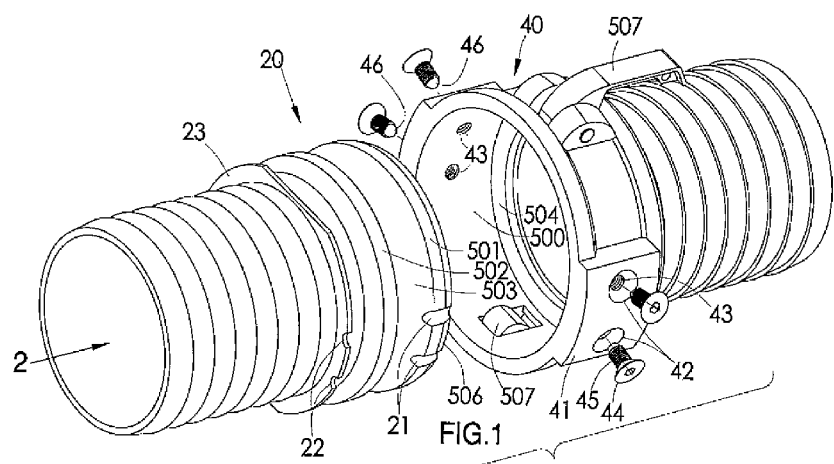
FIG.1
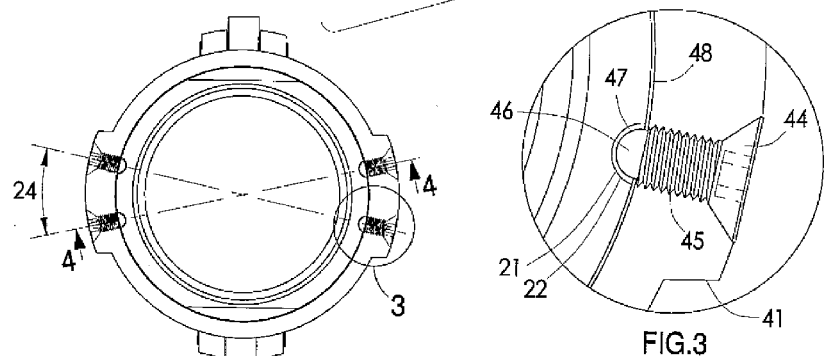
FIG.2
FIG.3
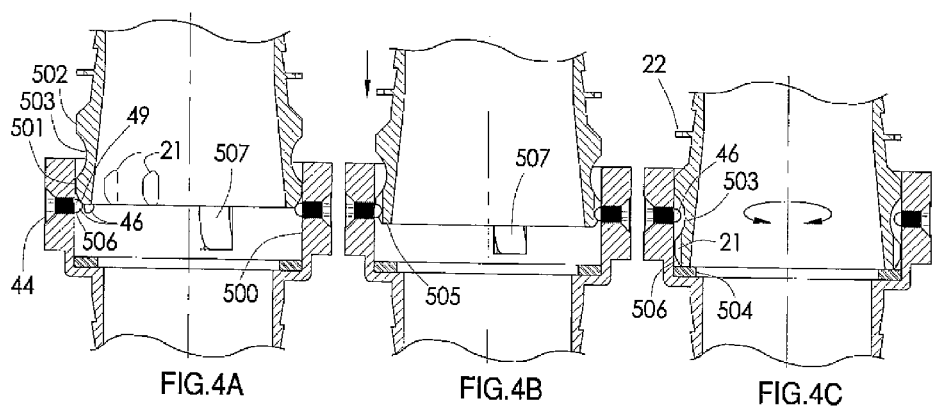
FIG.4A  FIG.4B  FIG.4C

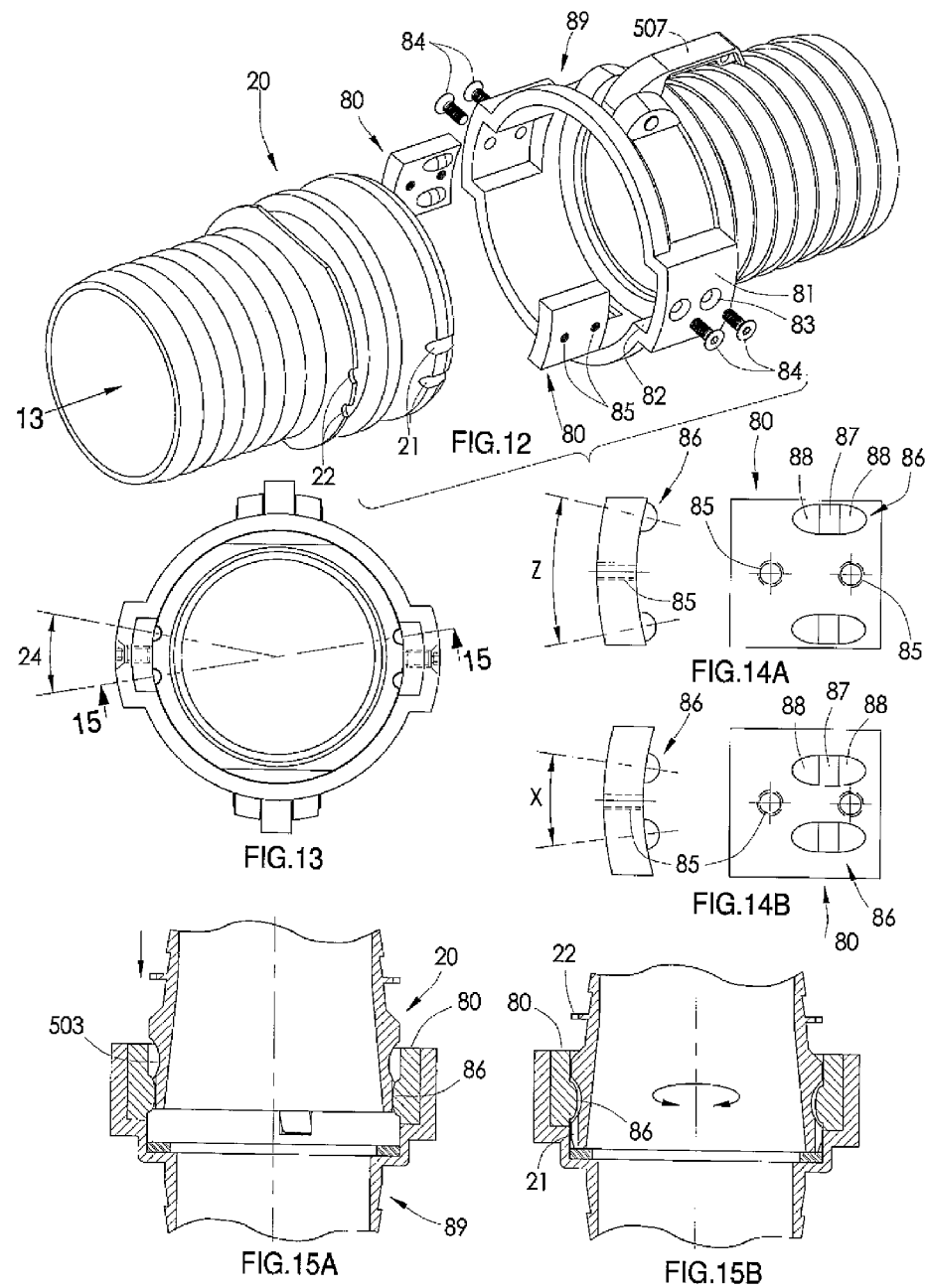

INTERLOCK COUPLING WITH COMPONENTS WHICH PREVENT INTERCHANGEABILITY

BACKGROUND

1. Field

This application relates to coupling devices specifically to such coupling devices which are used with hose, pipe, conduits, tanks, fittings and the like where the couplings have components which prevent interchangeability.

2. Prior Art

In U.S. Pat. No. 2,518,026 a Coupling, is disclosed that is commonly called a Camlock Coupling today. This Camlock Coupling is in general use today across a wide variety of industries. It is used for making quick release, fluid tight connections between hose, pipe, conduits, tanks, fittings and the like to facilitate the transport of liquids, solids and slurries.

The delivery of fuel to gas stations is an example of an industry that makes extensive use of Camlock Couplings for loading tanker trailers at fuel depots and unloading fuel from tanker trailers into storage tanks at gas stations. A typical tanker trailer will carry and unload a combination of diesel fuel, various grades of gasoline and ethanol based fuels. The Camlock Coupling used on the hose connections and related fittings is the same size and design regardless of the fuel being loaded or unloaded and this can result in cross contamination or accidental mixing of fuels in both the tanker trailer or more commonly in the storage tank at the gas station. For instance it is all too easy to connect a hose between the diesel compartment of the tanker trailer and the regular gasoline storage tank at the gas station since all the Camlock Coupling connections are identical. Even with procedures, color coding and tagging systems in place these "crossovers", as the industry refers to them, are all too common and costly to rectify. Diesel and gasoline mixes that end up in customer vehicles can result in expensive engine repairs and a serious loss of reputation in the marketplace for the oil company. Mixes can also result in motorist and boaters, becoming stranded with engine failure which can be a serious safety issue and a potential liability concern for Oil Companies.

Standard Camlock Couplings and related fittings and accessories are not designed to prevent crossovers. Thus a coupling that can be configured for a specific fuel from the tanker trailer discharge to the storage tank inlet and all the fittings and hose connections in-between would eliminate the potential for crossovers. This and other advantages will become apparent from a consideration of the ensuing description and accompanying drawings.

SUMMARY OF THE INVENTION

According to the invention there is provided a quick-disconnect coupling comprising:

a hollow male plug member having an external peripheral groove, a hollow female socket member defining an opening into which the male plug member can be inserted so as to be moved therein to a locking position;

the male plug member and female socket member defining a duct passing therethrough for communication of a fluid therebetween;

a locking arrangement for locking the male plug member in the female socket member at the locking position;

at least one protrusion provided on either an inside surface of the female socket member or on an outside surface of the male plug member;

at least one recess provided on either an inside surface of the female socket member or on an outside surface of the male plug member;

said at least one recess and said at least one protrusion being cooperatively shaped arranged to allow insertion of the male plug member into the female socket member to the locking position when said at least one recess and said at least one protrusion match.

Preferably there is provided a plurality of protrusions and a plurality of recesses at a predetermined spacing therebetween and wherein insertion of the male plug member into the female socket member to the locking position is allowed only when said predetermined spacing matches. However a single protrusion and associated recess can be used where they are set at a predetermined angle around the coupling and/or have a predetermined dimension and height.

Preferably there are provided elements identifying the location of the protrusions and recesses when the male plug member and the female socket member are connected and when they are separated so as to ensure alignment when relative movement is undertaken. That is the user can see the location of the elements to ensure that they are aligned as the user tries to insert the components or to separate.

That is for example the rotational and axial alignment for assembly and disassembly of the coupling can be made evident by way of the protrusions and recesses themselves and/or by the inclusion of additional alignment marks on the female socket member and/or on the male plug member of the assembled coupling.

Preferably the male plug member has an external peripheral groove for engagement with the locking arrangement of the female socket member and the protrusions and recesses are located to prevent movement of the groove to the locking arrangement unless aligned. This allows that the female socket member and the male plug member can be rotated relative to each other after assembly. That is the recess and the protrusion do not cooperate with the locking arrangement, which can be a cam lock, to hold the components connected but act as a restriction to allow the locking arrangement to engage only when the recess and protrusion match.

Preferably the protrusions are located on the female socket member and align with the groove when the male plug member is moved to the locking position.

Preferably there is provided a sealing member for sealing between the male plug and the socket in the locking position, the sealing member being spaced from the protrusions and the recesses so that they do not interfere with the action of the sealing member.

Preferably the sealing member is located at an end face of the male plug member. In this way misalignment or an act of aligning the protrusions and recesses does not damage the sealing member between the female socket member and the male plug member.

In particular the present invention is particularly designed for use with a cam lock system of the type in which the locking arrangement includes a plurality of cam members each having a lever within a respective side opening of the female socket member and a cam portion passing through one of said side openings and engaging a portion of the male plug member and each being pivotally connected to the female socket member for outward movement of the levers away from the female socket member to disengage the cam portions from the said portion of the male plug member.

Preferably the recess and/or protrusion is provided on a separate body portion which is inserted into a receptacle on the respective one of the female socket member and the male plug member to facilitate mounting of said recesses and protrusions.

Preferably the separate body portion is easily machined or otherwise configured to provide either a standard or configured coupling.

Preferably the matched protrusions and recesses are shaped and located so that they are not interchangeable with a coupling configured with a different configuration of protrusions and recesses.

Preferably the recess is formed by machining, casting or other methods in the male plug member of the coupling.

Preferably the protrusion is formed by a cast feature, a machined fastener, pressed in pin, molded or cast insert or by any other means or processes in the female socket member.

Preferably the system allows for backwards compatibility with industry standard couplings. This can be achieved by the fact that one of the female socket member and the male plug member which carries the recesses can be used in an industry standard coupling having no protrusions.

Preferably the male plug member and the female socket member both have a circular cross-section. This allows rotation as mentioned above.

However the female socket member and the male plug member can have a common unique cross sectional shape different from circular. For example the cross-sections shape can be square with rounded corners.

According to a second aspect of the invention there is provided a method of delivering a plurality of different fluids comprising:

providing for each fluid a respective delivery duct;

providing in each delivery duct a coupling as defined above;

and arranging said at least one protrusion and said at least one recess of a first one delivery duct to have a different configuration from that of a second one of the delivery ducts to prevent interchangeability of the first and second delivery ducts at the couplings.

DRAWINGS

Embodiments of the invention will be described hereinafter in conjunction with the accompanying drawings in which:

FIG. 1 is an isometric exploded view showing the new interlock coupling using flat head socket screws as the interlock protrusions.

FIG. 2 is a left end view of FIG. 1 showing the recesses and protrusions aligned to permit assembly.

FIG. 3 is an enlarged detail view of one flat head socket screw interlock protrusion aligned with a single interlock recess showing the installation clearance.

FIG. 4A is a cross section view of FIG. 2 showing assembly interference between the interlock protrusions and misaligned interlock recesses.

FIG. 4B is a cross section view of FIG. 2 showing axial assembly permitted by alignment of the interlock protrusions and interlock recesses.

FIG. 4C is a cross section view of FIG. 2 showing relative rotation of the coupling that is possible after the interlock protrusions pass by the interlock recesses.

FIG. 12 is an isometric exploded view showing the new interlock coupling using oblong interlock protrusions as part of a molded or cast insert.

FIG. 13 is a left end view of FIG. 12 showing the interlock recesses and the inserts interlock protrusions aligned to permit assembly.

FIG. 14A is an enlarged front and left end view of a cast insert with oblong interlock protrusion spaced Z degrees apart.

FIG. 14B is an enlarged front and left end view of a cast insert with oblong interlock protrusion spaced W degrees apart.

FIG. 15A is a cross section view of FIG. 13 showing axial assembly permitted by alignment of the oblong interlock protrusions with the interlock recesses.

FIG. 15B is a cross section view of FIG. 13 showing relative rotation of the coupling that is possible after the oblong interlock protrusions passes the interlock recesses.

DRAWINGS - Reference Numerals

Figure 5A:
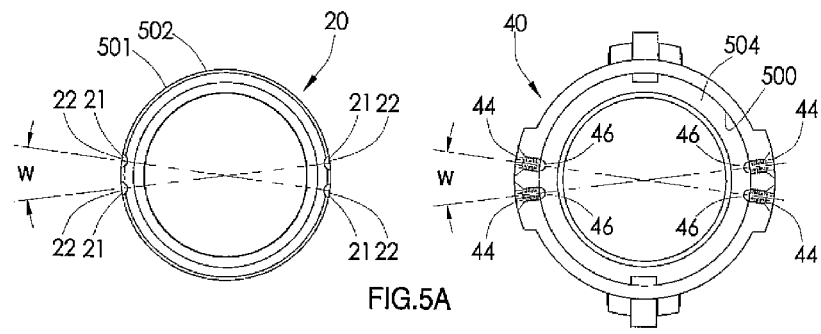
FIG. 5A shows an end view of the male and female halves of the coupling with mating interlock protrusions and interlock recesses spaced W degrees apart. W=15 degrees.
Figure 5B:
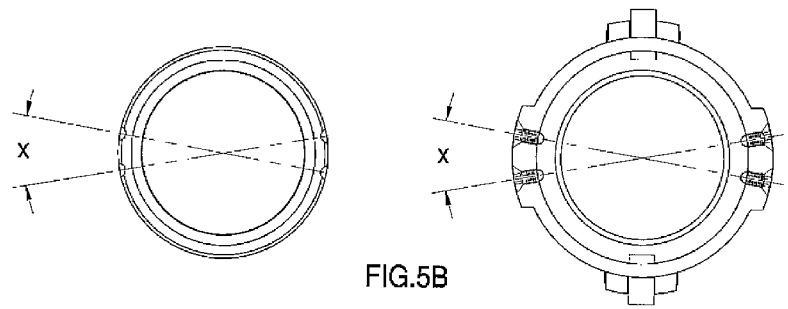
FIG. 5B shows an end view of the male and female halves of the coupling with mating interlock protrusions and interlock recesses spaced X degrees apart. X=20 degrees.
Figure 5C:
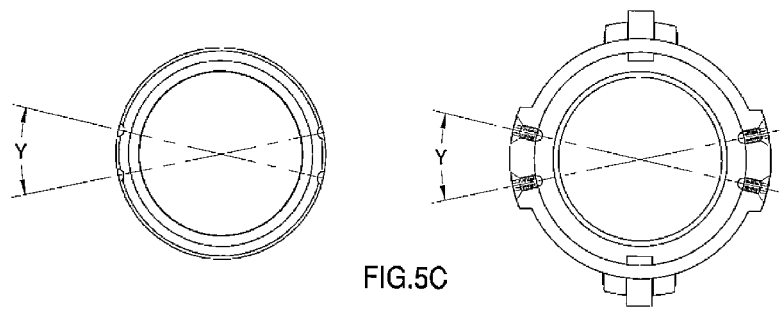
FIG. 5C shows an end view of the male and female halves of the coupling with mating interlock protrusions and interlock recesses spaced Y degrees apart. Y=25 degrees.
Figure 5D:
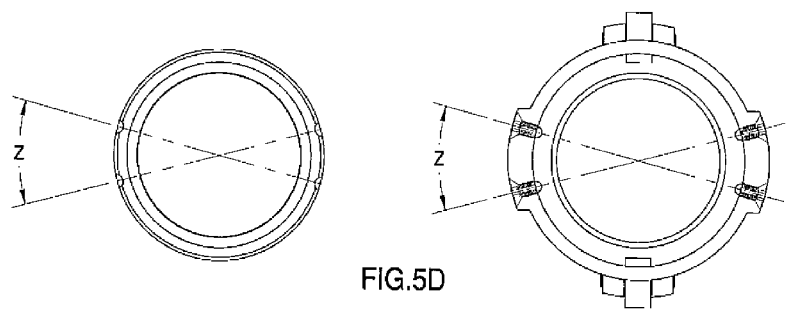
FIG. 5D shows an end view of the male and female halves of the coupling with mating interlock protrusions and interlock recesses spaced Z degrees apart. Z=30 degrees.

20 Male adapter of male plug member
21 Interlock recess
22 Alignment recess
23 Hose stop flange
24 Angular separation of recess -continued DRAWINGS - Reference Numerals 40 Female coupler of female socket member
41 Thickened body portion
42 Countersink
43 Threaded hole
44 Flat head socket screw
45 Threaded body
46 Interlock protrusion
47 Protrusion Clearance
48 Coupler Clearance
49 Interference
50 Tanker Trailer
51 API Valve
52 Valve Male Adapter
53 Tag Adapter Standard Female Coupler
54 Tag Adapter
55 Tag Adapter Configured Male Adapter
56 Dust Cap
57 Hose
60 Underground Tank - W fuel
61 Underground Tank - Z fuel
62 Top Seal Male Adapter
63 Drop Elbow Female Coupler
64 Drop Elbow
65 Drop Elbow Male Adapter
70 Rivet
71 Hemispherical End
72 Shank
73 Unformed End
74 Formed End
75 Mounting Hole
80 Insert
81 Offset Portion
82 Pocket
83 Countersink
84 Flat Head Socket Screw
85 Tapped Hole
86 Cast Protrusion
87 Cylindrical Portion
88 Trailing Ellipse Portion
89 Leading Ellipse Portion
90 Cast In Place Protrusion
91 Oblong Portion
92 Cylindrical Portion
93 Male Adapter
94 Female Coupler
95 Cast In Place Indicator
96 Oblong Portion
97 Cylindrical Portion
100 Cast Interlock Protrusion
101 Recess Grooves
102 Thickened Body Portion
110 Rectangular Female Coupler
111 Rectangular Male Adapter
500 Circular Passage
501 Circular Plug
502 Circular Plug
503 Curved Annual Groove
504 Sealing Ring
505 Sealing Surface
506 Lead-in Chamfer
507 Camlock Lever

DETAILED DESCRIPTION

FIG. 1 shows one embodiment of a nominal 4" Camlock coupling with a male adapter 20 and a mating female coupler 40. Both the male adapter and female coupler are shown with hose barb ends but it will be obvious to anyone skilled in the art that any means of connecting the coupling halves to any other device, conduit or fitting for use may be provided without departing from the spirit of the invention. Further, while a Camlock style coupling is used to illustrate the invention it will be obvious to anyone skilled in the art that other types of couplings can also benefit from this improvement. The basic form, fit and function of the coupling is disclosed in U.S. Pat. No. 2,518,026 but with the following improvements;

One or more interlock recesses 21 in the male adapter 20 interlock with one or more interlock protrusions 46 in the female coupler 40.

A ball nose milling cutter can be used to mill slots that form the recesses 21. Various other processes such as casting or forming can also be used to create the recesses. The recess can be any shape found to simplify manufacturing, improve assembly and prevent damage to sealing surfaces.

The protrusion 46 is formed by machining or turning a hemispherical end 46 on the end of the fully threaded body 45 of standard 8 mm metric flat head socket screw 44. The protrusion can be any shape found to simplify manufacturing, improve assembly and prevent damage to sealing surfaces.

The female coupler 40 is cast with a thickened body portion 41 that is drilled and tapped with metric 8 mm threaded holes 43 that are countersunk 42 to accept the flat head socket screw 44 with hemispherical interlock protrusion 46.

A flat head socket screw was selected to provide a flush final assembly 40 that would help protect an otherwise protruding fastener head from damage or potential handling injuries. However any type of fastener, pressed in pin, rivet, cast profile or insert with a cast or formed profile could be used in place of the flat head socket screw.

Two Recesses 21 and two protrusions 46 are arranged with an angular separation 24 as shown in FIG. 2. The same angular separation is repeated on the opposite side of the coupling to provide symmetry and a balanced feel when assembling the coupling.

A virtually infinite number of symmetrical and asymmetrical angular arrangements of the interlock protrusions 46 and interlock recesses 21 are possible.

The goal is to configure sets of mutually exclusive arrangements of the interlocking protrusions and recesses so that only like configured coupling halves will fit with each other.

The recess 21 should provide a clearance fit 47, with a typical value of approximately 0.015" for the protrusion 46 as shown in FIG. 3 so as to allow easy assembly and disassembly of the coupling. The clearance fit 47 will be similar to the typical clearance fit 48 between the mating circular plug of the male adapter 501 & 502 and the circular passage of the female coupler 500.

FIG. 4A shows a cross section of FIG. 2 through two opposing protrusions 46 with male adapter recesses 21 misaligned so as to prevent assembly of the coupling due to interference 49 between the protrusion 46 and the lead-in chamfer 506 on the male adapter. FIG. 4A further illustrates that the interference 49 contacts the lead-in chamfer 506 of the male adapter 20 thereby protecting the sealing surface 505 from contact with the interlock protrusion to prevent potential damage to the sealing surface 505.

FIG. 4B shows a cross section of FIG. 2 through two opposing interlock protrusions 46 and interlock recesses 21 aligned to permit the coupling halves to interlock with each other during assembly.

FIG. 4C shows a cross section of FIG. 2 through two opposing protrusions 46 and recesses 21 after the recess and protrusion have bypassed each other and the leading end of the sealing surface 505 rests on the sealing ring 504. The protrusion 46 is located within the curved annual groove 503 of the male adapter. The coupling halves are free to rotate relative to each other prior to applying the Camlock levers 507 that are used to clamp and seal the coupling together.

Visible alignment recesses 22 are machined in the male adapter hose stop flange 23 and aligned with the recesses 21. This provides a visual reference between the angular spacing of the screws 44 on the female coupler and the male adapter for rotating and aligning the coupling halves prior to assembly or disassembly. Other connections, conduits and fittings attached to the male adapter could have similar alignment marks punched, scribed, machined, cast or formed to provide a similar visual alignment function.

FIGS. 5A, 5B, 5C and 5D show an example of four unique angular configurations (W, X, Y & Z respectively) that can only mate with another fitting with the same angular configuration. W configured female couplers only mate with W configured male adapters. W configured fittings will not mate with fittings configured with X, Y or Z angular configurations.

Where required any standard female coupler, without protrusions 46, can still mate with any configured male adapter with recesses 21. This allows for backward compatibility with standard fittings where desired or required.

Figure 6:
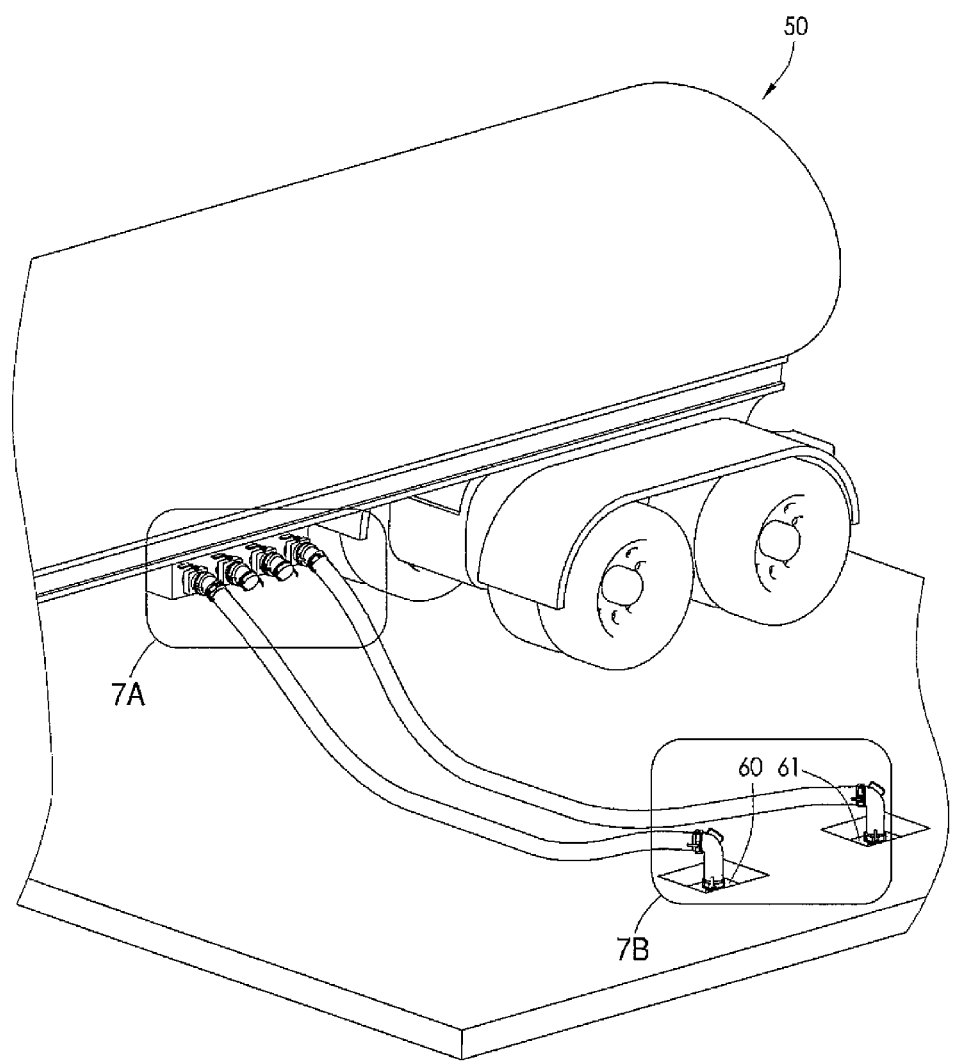
FIG. 6 shows an isometric view of a tanker trailer with transfer hoses and related fittings connecting it to the top seal connections on underground fuel storage tanks.

FIG. 6 shows one example of a system of fittings and hose used to unload fuel at gas stations. Many other systems of fittings and hose are also used to load and unload tanker trailers and can be adapted to use a configured interlock coupling disclosed here-in. The tanker trailer 50 will be parked near to the underground fuel storage tanks 60 and 61 as shown. The tanker trailer 50 is divided into separate compartments that can carry different fuels such as Diesel, Premium, Regular and Ethanol blends in a single delivery to a gas station. Similarly, a typical gas station has multiple underground fuel storage tanks 60, 61 etc. that can receive any or all of these fuels from a single tanker trailer delivery.

Figure 7A:
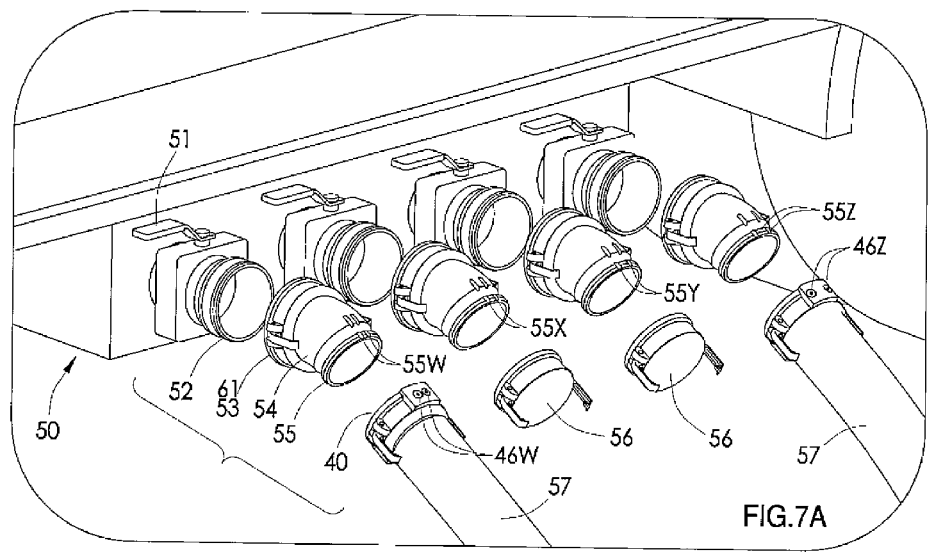
FIG. 7A shows an isometric exploded view of the trailer to hose connections.
Figure 7B:
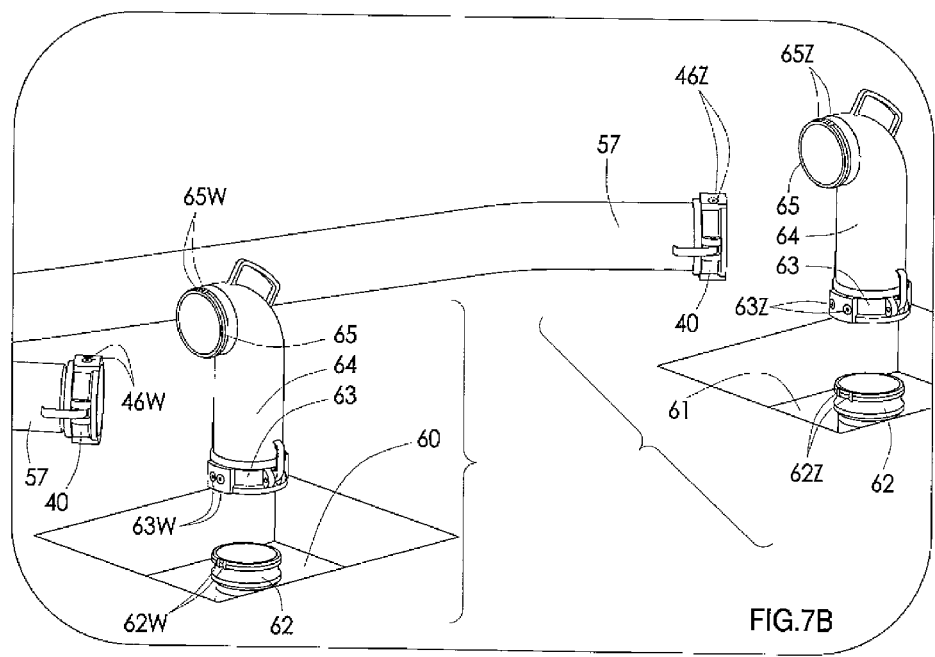
FIG. 7B shows an isometric exploded view of the hose connections to the top seal male adapters on the underground fuel storage tanks.

The industry currently relies on tagging procedures and color coding systems to help prevent incorrect connections between the trailer FIG. 7A and the underground storage tank FIG. 7B. Even with procedures and systems in place it is not uncommon for mixes or crossovers to occur. A premium gasoline and regular gasoline crossover will result in a costly downgrade of the premium fuel along with the time and expense to pump the downgrade into the regular grade storage tank. A diesel and gasoline mix is far more serious and expensive to rectify since the fuel is no longer useable as either gasoline or diesel and must be pumped out of the storage tank and disposed of. Diesel and gasoline crossovers that end up in vehicles can cause severe damage to fuel systems and engines and lead to expensive repairs along with a loss of reputation in the marketplace for the oil company that can result in further lost revenue. Mixes can also result in motorist and boaters becoming stranded with engine failure which can be a serious safety issue and a potential liability concern for Oil Companies.

FIG. 7A shows a tanker trailer 50 configured with four API valves 51 each connected to a separate fuel compartment in the trailer. The API valve 51 remains attached to the trailer 50 during loading and unloading of fuel. The ends of the API valves 51 terminate with a standard male adapter 52. A "standard" male adapter or female coupler does not have interlock recesses or interlock protrusions. The four tag adapters 54 have a standard female coupler end 53. The male adapter end 55 of the four tag adapters 54 have interlock recesses 55W, 55X, 55Y and 55Z spaced W, X, Y and Z degrees apart. See FIG. 5A through FIG. 5D for end views of these configurations. Each angular spacing W, X, Y and Z represents in this case a different fuel such as Diesel, Premium, Regular and Ethanol carried by the trailer 50. It is understood that the valve and fitting configuration shown in FIG. 7A is only one of many possible configurations. For instance the trailer 50 could be configured with additional or fewer fuel carrying compartments with corresponding terminating API valves 51. The trailer can also carry the same fuel in more than one compartment and in this case the same tag adapter configuration would be used on the two API valves communicating with the two compartments carrying the same fuel.

The standard female coupler 53 of the tag adapter 54 is attached and preferably locked to the API valve 51 at the fuel depot to tag which fuel is contained in a given compartment and to ensure that this tag cannot be accidentally removed or tampered with.

The dust cap 56 is installed during transport and is a standard female coupler that can be used on the ends 55 of all the configured tag adapters 54.

The tag adapter 54 with its particular recess configuration 55W, 55X, 55Y and 55Z acts as a tagging system to identify the fuel stored in a particular compartment of the trailer. Therefore manual tagging and color coding procedures could be eliminated with this system or used together with this system to act as an additional visual reference and barrier for preventing crossovers.

The tag adapter 54 works like a key that only permits like configured fittings and accessories to interlock with each other.

In FIG. 7A the left most tag adapter 54 labeled W is connected as shown in FIG. 7B to tank adapter 62 with configured recessed end 62W that communicates with an underground storage tank 60 through a hose 57 with female hose couplers 40 on both ends configured with interlock protrusions 46W on both ends and a drop elbow fitting 64 with a female coupler configured with interlock protrusions 63W and a male adapter configured with recesses 65W.

Although not illustrated a similar system of configured fittings can be used to bottom load trailers at the fuel depot to ensure the correct fuel is loaded into the correct compartment of the trailer.

The W, X, Y, Z recess and protrusion configurations and any other required configurations would be standardized industry wide for particular fuels. With a standard in place the first step would be to replace gas station tank male adapters with male adapters configured for a particular fuel. Since the system is backwards compatible with standard Camlock fittings there will be no interruption in fuel delivery service if tanker trailers are still operating without configured fittings and accessories. Tanker trailers typically carry multiple sets of hoses and fittings, one set for each fuel delivered. Therefore the quantity of hose and fittings is the same only now they are configured for a particular fuel. There is also no appreciable change in procedures for unloading fuel except that there is now positive feedback when a connection is attempted between say a Diesel and Premium fitting. Since configured fittings and accessories are not compatible with each other and will not physically fit together the potential for crossovers is prevented.

FIGS. 8, 9, 10, 11A, 11B show an additional embodiment that uses a rivet 70 with a hemispherical head 71 as the interlock protrusion. The shank portion 72 of the rivet 70 is installed from the inside surface 500 of the female coupler 40 through mounting holes 75 drilled through from the outside wall 506 of the female coupler right through the inside wall 500. The end of the rivet 73 is formed with a riveting tool (not shown) to produce a formed head 74 that locks the rivet in place. Any standard or purpose built fastener can be used in place of the rivet and installed from the inside surface 500 where the head of the fastener becomes the interlock protrusion and the shank portion is threaded to accept a nut installed on the threaded shank that bears against the outside surface 506.

Advantages of this embodiment include;

The rivet provides a semi-permanent attachment of the protruding element that will prevent easy removal or tampering.

A standard female coupler casting can be drilled to accept a rivet or fastener installed from the inside. A custom casting with a thickened body portion 41, to facilitate a threaded hole 43, as shown in FIG. 1 is not required.

FIGS. 12, 13, 14A, 14B, 15A, 15B show an additional embodiment that uses a cast or formed insert 80 that includes protrusions 86 that form part of the insert 80. The female coupler casting 89 includes one or more offset portions 81 and associated pockets 82 sized to accept the insert 80. The insert is held in place with one or more fasteners 84. The insert 80 includes one or more tapped holes 85 and the female coupler casting includes one or more countersunk mounting holes 83 to facilitate mounting of the insert 80 to the female coupler pocket 82 with flat head socket screws 84.

The interlock protrusion 86 is formed with a partially cylindrical protrusion 87 that tapers to an oblong elliptical shape 88 at each end. The overall cast protrusion 86 is shaped and sized to fit the annular curved groove 503 of the male adapter with clearances to provide for easy assembly, disassembly and relative rotation prior to the cam levers 507 being engaged.

Advantages of this embodiment include;

Easily interchangeable inserts that are pre-configured with different protrusion angular offsets such as the two examples shown in FIGS. 14A and 14B.

A single female coupler casting 89 can accommodate multiple different insert configurations 80. This modular system permits female couplers to be easily configured and reconfigured by the end user as required.

Two different insert configurations (ie both 14A and 14B) can be installed in a single female coupler 89 to provide additional unique combinations where required.

Figure 16:
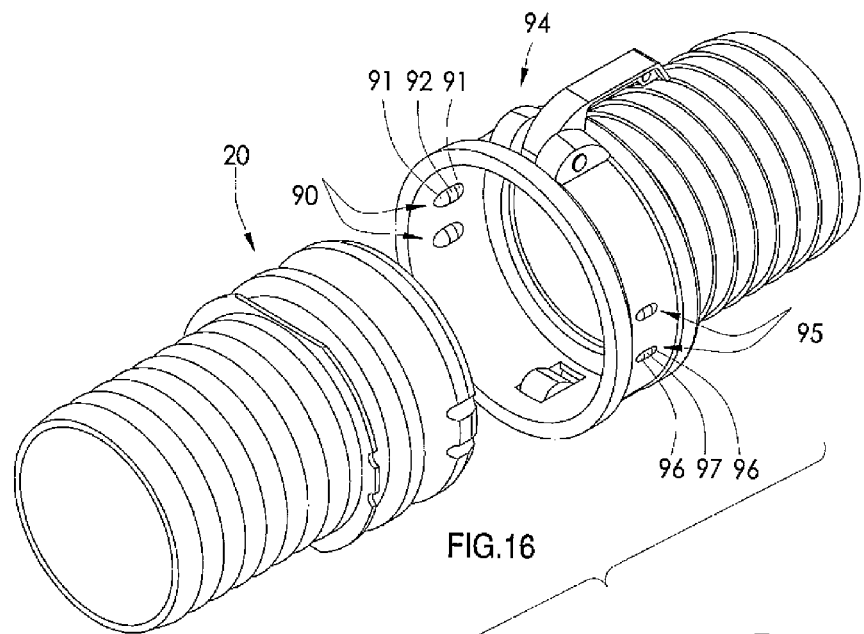
FIG. 16 is an isometric view showing cast in place interlock protrusions.

FIG. 16 shows an additional embodiment that has interlock protrusions 90 cast directly into the female coupler casting 94. The cast interlock protrusion 90 is shaped with a partially cylindrical protrusion 92 that tapers to an oblong or elliptical shape 91 at each end. This same shape 95 is replicated on the outside surface of the female coupler 94 with similar cylindrical protrusion 97 that tapers to oblong or elliptical ends 96 that act as a visual reference to assist with rotating and aligning the male adapter 93 and female coupler 94.

Advantages of this embodiment include;

Both the male adapter and female couplers are purchased with specific industry standard configurations of interlock protrusions that are ready to use without any further user intervention.

Lowest cost production method for the female couplers as no additional machining or assembly is required.

Figure 17:
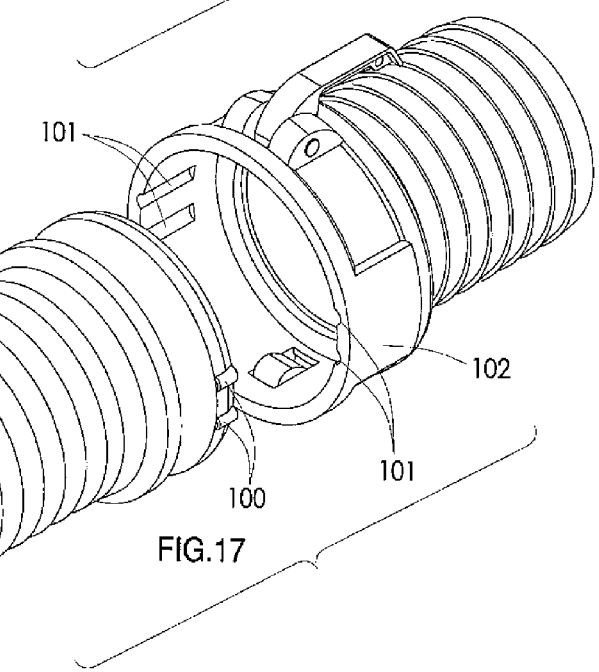
FIG. 17 is an isometric view showing the interlock protrusion on the male adapter and the interlock recess on the female coupling.

FIG. 17 shows an additional embodiment that has the interlock protrusions 100 located on the male adapter and the recesses 101 located on the female coupler.

Advantages of this embodiment include;

With the protrusion moved to the male adapter and the male adapter used as the tank adapter it would prevent the connection of standard female couplers. This will further limit the possibility of a crossover since the only female coupler that with fit is one configured specifically to match this male coupler. This is different from the other embodiments that still permit backwards compatibility with standard female couplers.

The embodiment shown prevents relative rotation of the coupling halves after assembly which eliminates the requirement to align the coupling halves prior to disassembly.

Figure 18A:
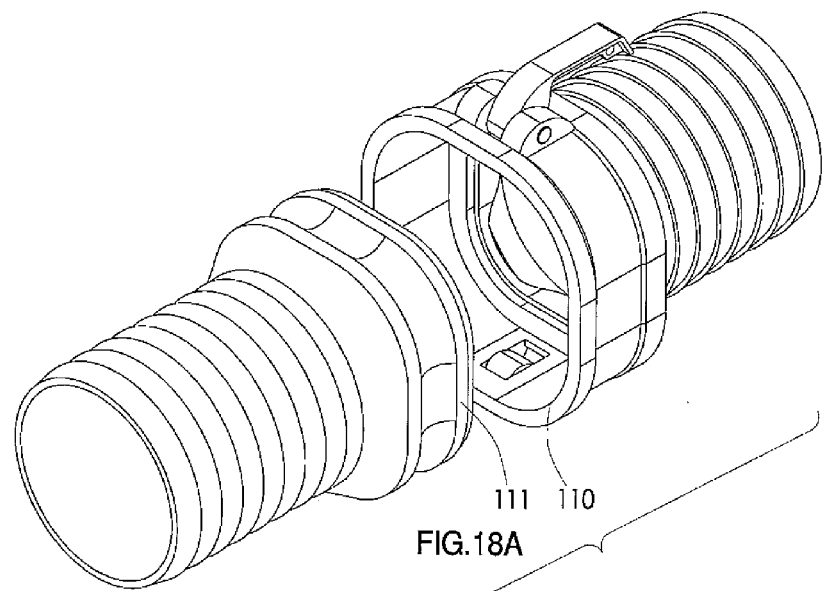
FIG. 18A is an isometric exploded view of an interlock coupling utilizing a rounded rectangle shape as the interlock protrusion and interlock recess.
Figure 18B:
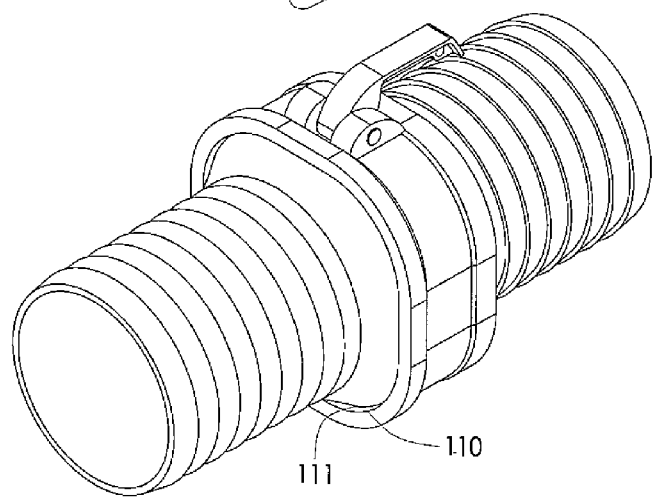
FIG. 18B is an isometric assembled view of an interlock coupling utilizing a rounded rectangle shape as the interlock protrusion and interlock recess.

FIGS. 18A, 18B show an additional embodiment of an interlock coupling that relies on a specific and unique shape such as the square with rounded corners shape used on the male adapter 111 and on the female coupler 110. As with the protrusions and recesses used on the other embodiments a family of unique shapes can be selected, one shape for each of the various grades and types of fuels delivered. For example the square with rounded corners shape could be used for diesel, a triangle with rounded corners could be used for premium, an oval shape could be used for regular and other shapes can be used for other fuels.

Advantages of this embodiment include;

Unique and distinct shapes provide immediate visual recognition for connecting compatible couplings and accessories With a unique and distinct shape used as the male tank adapter and also used on tanker trailer tag adapter it would prevent the connection of any other standard or distinctly shaped female couplers. This will completely eliminate the possibility of a crossover since the only female coupler and related accessories that with fit is one configured with the same shape to match this male adapter. This is different from the other embodiments that still permit backwards compatibility with standard female couplers.

The embodiment shown prevents relative rotation of the coupling halves after assembly which eliminates the requirement to align the coupling halves prior to disassembly. If rotation of a particular accessory such a drop elbow is required, a swivel connection, as is already commonly used on many types of fittings, could be provided at a suitable location between the female coupler and the male adapter ends of the drop elbow or any other fitting or accessory requiring this feature.

Summary of Embodiments Presented

Figure 8:
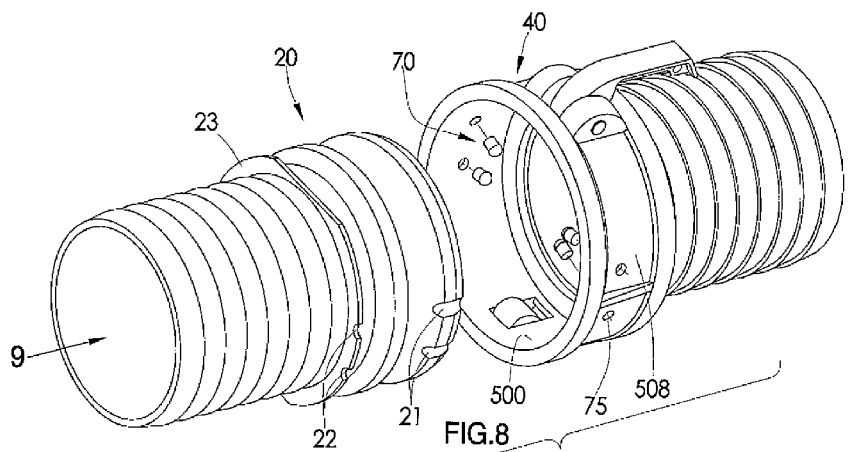
FIG. 8 is an isometric exploded view showing an interlock coupling using rivets with a hemispherical head as the interlock protrusions.
Figure 9:
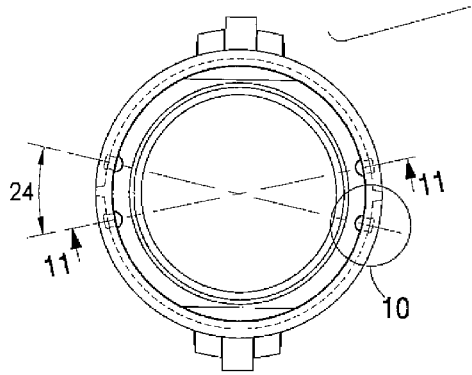
FIG. 9 is a left end view of FIG. 8 showing the interlock recesses and interlock protrusions aligned to permit assembly.
Figure 10:
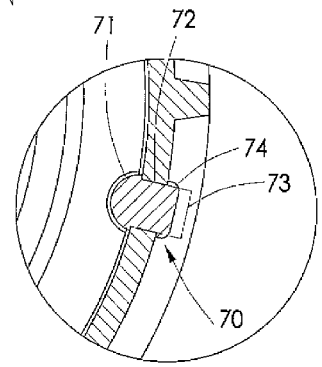
FIG. 10 is an enlarged detail view of one rivet interlock protrusion aligned with a single interlock recess showing the installation clearance.
Figure 11A:
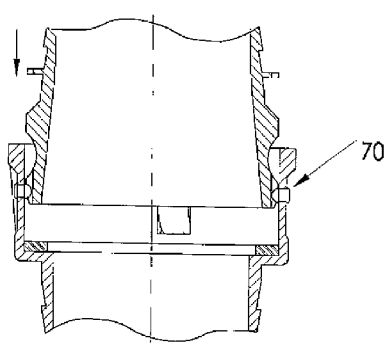
FIG. 11A is a cross section view of FIG. 9 showing axial assembly permitted by alignment of the interlock protrusions and interlock recesses.
Figure 11B:
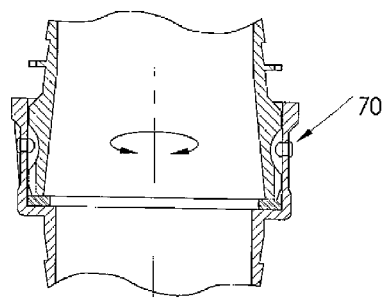
FIG. 11B is a cross section view of FIG. 9 showing relative rotation of the coupling that is possible after the interlock protrusions pass by the interlock recesses.

The embodiments described are not meant to limit the scope of the invention but rather to illustrate just a few of the possible configurations possible within the spirit of this invention. No particular embodiment is preferred at this time as there are advantages to each embodiment presented. For instance it may be desirable to use existing fittings and accessories modified as shown in FIG. 8 to test the system with various protrusion and recess configurations, shapes and sizes before committing to an industry standard and the expense of custom castings and mass production. After industry acceptance and standardization it will be desirable to minimize the costs of the various fittings and accessories so multiple castings with the specific recesses and protrusions for each fuel may be desirable as shown in FIG. 16. Other embodiments such as shown in FIG. 1 and FIG. 12 allow for standardization on a single casting for both the male adapter and the female coupler that can be configured through the use of cast inserts FIG. 12 or machining specific configurations FIG. 1.

Finally, while the example of fuel unloading at gas stations using an improved Camlock fitting to prevent crossovers is presented the invention is not limited to this industry or this style of coupling. Many industries now and in the future may have a need to prevent crossovers and will be able to make use of this improved interlock coupling and system utilizing other styles of couplings that can be adapted in the same way without departing from the spirit of the improved interlock coupling disclosed above.

The invention claimed is:

1. A quick-disconnect coupling comprising:

a hollow male plug member;

a hollow female socket member defining an opening into which a leading end of the male plug member can be inserted so that the male plug member is moved longitudinally with respect to the longitudinal axis of the female socket member into the opening to a locking position;

the male plug member and female socket member defining a duct passing therethrough for communication of a fluid therebetween;

a locking arrangement for locking the male plug member in the female socket member at the locking position;

wherein the locking arrangement includes a plurality of cam members each having a respective lever within a respective side opening of the female socket member and a cam portion passing through one of said side openings for movement radially inwardly towards the axis of the female socket member into locking engagement with a portion of the male plug member;

each cam member being pivotally connected to the female socket member for radially outward movement of the respective lever to disengage the cam portions from said locking engagement with said portion of the male plug member;

wherein said portion of the male plug member comprises an annular groove arranged to align with said cam members such that rotation of the male plug member can occur around the longitudinal axis relative to the female socket member while said cam members are capable of rotating freely around the entire annular groove to any selected angular position thereof;

cooperating components provided on an inside surface of said female socket member and on an outside surface of said male plug member;

said cooperating components comprising at least one protrusion provided on an inside surface of the female socket member;

said cooperating components comprising at least one recess provided on an outside surface of the male plug member;

said cooperating components defined by said at least one recess and said at least one protrusion being cooperatively shaped and arranged to allow insertion of the male plug member into the female socket member to the locking position when said at least one recess and said at least one protrusion match;

wherein said at least one protrusion on the inside surface of the female socket member is arranged to align with said annular groove on the portion of the male plug member at the locking position such that rotation of the male plug member can occur around the longitudinal axis relative to the female socket member while said at least one protrusion is capable of rotating freely around the entire annular groove to any selected angular position thereof;

and wherein said locking arrangement is arranged for locking the male plug member in the female socket member at the locking position in said selected angular position by operation of said cam members;

and wherein said locking arrangement operates separately from said cooperating components;

whereby the cooperating components do not engage with the locking arrangement to bring the male plug member and female socket member into locking engagement with each other but act as a restriction to allow the locking arrangement to engage only when said at least one protrusion and said at least one recess match, wherein in the locking position the male plug member is inserted into the female socket member and the at least one protrusion of the cooperating components and the plurality of cam members of the locking arrangement are located in the annular groove.

2. The coupling according to claim 1 wherein the cooperating components comprise a plurality of protrusions and a plurality of recesses at a predetermined spacing therebetween and wherein insertion of the male plug member into the female socket member to the locking position is allowed only when said predetermined spacing matches.

3. The coupling according to any one of claim 1 or 2 wherein said at least one protrusion is provided on a separate body portion which is inserted into a receptacle on the respective one of the female socket member to facilitate mounting of said protrusions.

4. The coupling according to claim 2 wherein there are provided elements visually identifying the location of the protrusions and recesses when the male plug member and the female socket member are connected and when they are separated so as to ensure alignment when relative movement is undertaken.

5. The coupling according to any one of claim 1 or 2 wherein said cooperating component on the outside surface of the male plug member is located at said leading end of the male plug member.

* * * * *